United States Patent
Cervantes

(10) Patent No.: US 11,341,334 B2
(45) Date of Patent: May 24, 2022

(54) METHOD AND APPARATUS FOR EVALUATING NATURAL LANGUAGE INPUT TO IDENTIFY ACTIONS AND LANDMARKS

(71) Applicant: HERE Global B.V., Eindhoven (NL)

(72) Inventor: Christopher Cervantes, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 325 days.

(21) Appl. No.: 16/774,315

(22) Filed: Jan. 28, 2020

(65) Prior Publication Data
US 2021/0232769 A1 Jul. 29, 2021

(51) Int. Cl.
*G06F 17/00* (2019.01)
*G06F 40/30* (2020.01)
*G06F 40/295* (2020.01)

(52) U.S. Cl.
CPC .......... *G06F 40/30* (2020.01); *G06F 40/295* (2020.01)

(58) Field of Classification Search
None
See application file for complete search history.

(56) References Cited

U.S. PATENT DOCUMENTS

| | | | |
|---|---|---|---|
| 9,465,796 B2 | 10/2016 | Cheng | |
| 2018/0121787 A1* | 5/2018 | Hashimoto | G06N 3/08 |
| 2018/0121788 A1* | 5/2018 | Hashimoto | G06N 3/08 |
| 2018/0121799 A1* | 5/2018 | Hashimoto | G06N 3/084 |
| 2018/0349359 A1* | 12/2018 | McCann | G06F 40/47 |
| 2018/0373682 A1* | 12/2018 | McCann | G06N 3/08 |
| 2019/0034416 A1* | 1/2019 | Al Hasan | G06N 3/0454 |
| 2019/0163743 A1 | 5/2019 | Khov et al. | |

(Continued)

FOREIGN PATENT DOCUMENTS

| | | |
|---|---|---|
| CN | 102306145 A | 1/2012 |
| CN | 103514157 A | 1/2014 |

OTHER PUBLICATIONS

Abu-Aisheh, Z. et al., *An Exact Graph Edit Distance Algorithm for Solving Pattern Recognition Problems*, 4th International Conference on Pattern Recognition Applications and Methods (2015) 8 pages.

(Continued)

*Primary Examiner* — Satwant K Singh
(74) *Attorney, Agent, or Firm* — Here Technologies

(57) ABSTRACT

A method, apparatus and computer program product are provided to evaluate natural language input to identify actions and landmarks, such as for the generation of a landmark graph. In a method, one or more word representations are encoded in context based upon one or more other word representations within a sentence of the natural language input. The method also generates an action context vector defining actions that occur during each of a plurality of time steps and generates a state context vector defining one or more landmarks associated with each of the plurality of time steps. The method predicts the state for a respective time step by defining the one or more landmarks associated with the respective time step. The method also predicts an action for the respective time step based on the action context vector and the state context vector.

20 Claims, 6 Drawing Sheets

(56) References Cited

U.S. PATENT DOCUMENTS

2019/0325088 A1* 10/2019 Dubey ............... G06F 16/9038
2019/0325628 A1* 10/2019 Dubey ............... G06T 11/60

OTHER PUBLICATIONS

Anderson, P. et al., *Vision-and-Language Navigation: Interpreting Visually-Grounded Navigation Instruction in Real Environments*, Computer Vision Foundation (dated 2018) 3674-3683.

Andreas, J. et al., *Alignment-Based Compositional Semantics for Instruction Following*, Empirical Methods in Natural Language Processing (2015) 10 pages.

Artzi, Y. et al., *Weakly Supervised Learning of Semantic Parsers for Mapping Instructions to Actions*, Transactions of the Association for Computational Linguistics, 1 (2013) 49-62.

Chen, D. L. et al., *Learning to Interpret Natural Language Navigation Instructions From Observations*, Proceedings of the Twenty-Fifth AAAI Conference on Artificial Intelligence (2011) 859-865.

Chen, H. et al., *TOUCHDOWN: Natural Language Navigation and Spatial Reasoning in Visual Street Environments*, Computer Vision Foundation (dated 2019)12538-12547.

Duvallet, F. et al., *Inferring Maps and Behaviors From Natural Language Instructions*, Experimental Robotics (Nov. 2015) 37-388, 15 pages.

Fellner, I. et al., *"Turn Left After the WC, and Use the Lift to Go to the $2^{nd}$ Floor"—Generation of Landmark-Based Route Instructions for Indoor Navigation*, International Journal of Geo-Information 6 (2017) 23 pages.

Hochreiter, S. et al., *Long Short-Term Memory*, Neural Computation 9(8) (1997) 1735-1780, 32 pages.

Kennington, C. et al., *Simple Learning and Compositional Application of Perceptually Grounded Word Meanings for Incremental Reference Resolution*, Proceedings of the $53^{rd}$ Annual Meeting of the Association for Computational Linguistics and the $7^{th}$ International Joint Conference on Natural Language Processing (2015) 292-301.

Kingma, D. P. et al., *Adam. A Method for Stochastic Optimization*, Conference Paper at ICLR 2015 (2014) 1-15.

Kollar, T. et al., *Toward Understanding Natural Language Directions*, HRI'10: Proceedings of the $5^{th}$ ACM/IEEE International Conference on Human-Robot Interaction (Mar. 2010) 8 pages.

Kong, C. et al., *What Are You Talking About? Text-To-Image Coreference*, Computer Vision Foundation (dated 2014) 8 pages.

Krishnamurthy, J. et al., *Jointly Learning to Parse and Perceive: Connecting Natural Language to the Physical World*, Transactions of the Association for Computational Linguistics 1 (2013) 193-206.

Landsiedel, C. et al., *A Review of Spatial Reasoning and Interaction for Real-World Robotics*, Advanced Robotics (2017) 25 pages.

Landsiedel, C. et al., *Route Description Interpretation on Automatically Labeled Robot Maps*, Proceedings—IEEE International Conference on Robotics and Automation (May 2013) 6 pages.

Lee, K. et al., *End-To-End Neural Coreference Resolution*, arXiv:1707.07045v2 (Dec. 15, 2017) 10 pages.

MacMahon, M. et al., *Walk the Talk: Connecting Language, Knowledge, and Action in Route Instructions*, American Association for Artificial Intelligence (2006) 1475-1482.

Mei, H. et al., *Listen, Attend, and Walk: Neural Mapping of Navigational Instructions to Action Sequences*, Proceedings of the Thirtieth AAA1 Conference on Artificial Intelligence (AAA1-16) (2016) 2772-2778.

Mikolov, T. et al., *Distributed Representations of Words and Phrases and Their Compositionality*, Neural Information Processing Systems (2013) 9 pages.

Peng, H. et al., *A Joint Framework for Coreference Resolution and Mention Head Detection*, Proceedings of the $19^{th}$ Conference on Computational Language Learning (Jul. 2015) 12-21.

Plummer, B. A. et al., *Flickr30k Entities: Collecting Region-to-Phase Correspondence For Richer Image-to-Sentence Models*, Computer Vision Foundation (2015) 2641-2649.

Plummer, B. A. et al., *Phrase Localization and Visual Relationship Detection With Comprehensive Image-Language Cues*, Computer Vision Foundation (2017) 1928-1937.

Richter, K.-G. et al., *Landmarks, GIScience For Intelligent Services*, Springer (2014) 223 pages.

Tsetsos, V. et al., *Semantically Enriched Navigation for Indoor Environments*, Int. J. Web and Grid Services, vol. 2, No. 4 (2006) 453-478.

Yang, L. et al., *Generation of Navigation Graphs for Indoor Space*, International Journal of Geographical Information Science (2015) 21 pages.

Zang, X. et al., *Behavioral Indoor Navigation With Natural Language Directions*, HRI'18 Companion (Mar. 2018) 283-284.

\* cited by examiner

METHOD AND APPARATUS FOR EVALUATING NATURAL LANGUAGE INPUT TO IDENTIFY ACTIONS AND LANDMARKS

TECHNOLOGICAL FIELD

An example embodiment relates generally to the evaluation of natural language input and, more particularly, to the evaluation of natural language input to identify actions and landmarks, such as in conjunction with the generation of a landmark graph.

BACKGROUND

The navigation of the last mile of a route is oftentimes the most challenging with more turns and changes in the roads to be taken and with roads sometimes becoming smaller and less well traveled and, thus, less well defined. Within this last mile, the navigation of the final portion, such as the last few meters, of a route can present even greater challenges. For example, in the context of the delivery of a package, navigation to an address may be fairly straightforward, but the delivery of the package to the intended doorstep or other delivery location at that address may be quite difficult, particularly in instances in which the address is associated with multiple buildings or a building with multiple entrances or an entrance that is at least somewhat hidden from the street.

Not only may the navigation instructions for the last few meters of a route be the most intricate and challenging to follow, but the navigation tools that otherwise facilitate navigation along the route may not be as effective in conjunction with this final portion of a route. In this regard, positioning techniques, such as global positioning system (GPS) techniques or other techniques reliant upon a global navigation satellite system (GNSS), may be of reduced reliability in some urban and/or indoor environments through which the final portion of many routes traverse. The reduced reliability of such positioning systems increases the difficulty associated with following a route that is predicated upon knowledge of the position of the person attempting to follow the route. Additionally, navigation tools that rely upon pictures or video images of the last few meters of a route including the intended destination, e.g., the doorstep, may be impractical in at least some regions as a result of concerns associated with the privacy expectations of persons or other entities, e.g., companies, at or near the intended destination.

Furthermore, the geometric spatial representations utilized by conventional navigation maps are different than the manner in which people intuitively conceive of a route and navigation along the route. As such, even in instances in which a navigation map presenting a geometric spatial representation of the last few meters of a route is available, a person, such as a delivery person, may sometimes find the navigation map to be difficult to follow, particularly in instances in which the route over the last few meters has many twists and turns such that the destination is not visible until the very end of the route.

BRIEF SUMMARY

A method, apparatus and computer program product are provided in accordance with an example embodiment in order to evaluate natural language input to identify actions and landmarks, such as in conjunction with the generation of a landmark graph. As people are better able to utilize a landmark graph in order to navigate in an instinctual or intuitive manner, the generation of a landmark graph based upon natural language input provides a navigation tool that facilitates more efficient navigation over the final portion, such as the last few meters, of a route and provides for an increased likelihood of reaching the intended destination. In this regard, the natural language input may provide directions over the final portion of a route to an intended destination in the same manner in which people intuitively navigate, that is, based upon landmarks. Thus, the identification of actions and landmarks from their natural language input and the generation of a landmark graph facilitates navigation over the final portion of the route in a manner consistent with the directions provided via the natural language input and in a manner more readily understandable by people.

In an example embodiment, a method is provided for evaluating natural language input to identify actions and landmarks. The method includes encoding one or more word representations in context based upon one or more other word representations in at least one of a forward direction or a backward direction within a sentence of the natural language input. The method also includes generating an action context vector defining actions that occur during each of a plurality of time steps and generating a state context vector defining one or more landmarks associated with each of the plurality of time steps. The method further includes predicting the state for a respective time step by defining the one or more landmarks associated with the respective time step. In this regard, the method generates the state context vector and predicts the state based upon a combination of a result of encoding the one or more word representations in at least one of the forward direction or the backward direction within the sentence, the one or more word representations and the state predicted during a prior time step. The method also predicts an action for the respective time step based on the action context vector and the state context vector.

The method of an example embodiment encodes the one or more word representations by generating separate representations of each character of a word and then combining the representations of the characters of the word to produce a first representation of the word. The method of this example embodiment also generates a second representation of the word as a whole and combines the first and second representations of the word. In this example embodiment, the encoding of the one or more word representations may also include encoding a result of combining the first and second representations of the word both in the forward direction based at least in part upon a subsequent word within the sentence and in the backward direction based at least in part upon a prior word within the sentence.

The method of an example embodiment generates the action context vector by generating the action context vector based at least partially upon a plurality of attention weights associated with respective time steps, actions and words of the sentence. In an example embodiment, the method generates the state context vector by generating the state context vector based at least partially upon a plurality of attention weights associated with respective time steps, actions and words of the sentence. The method of an example embodiment predicts the state for a respective time step by evaluating in accordance with a sigmoid function a vector of scores indicative of whether a respective word refers to a landmark for a respective time step.

The method of an example embodiment also includes generating a landmark graph based upon the actions and the states that are predicted for the respective time steps. In this regard, the landmark graph includes a plurality of decision points defined by the respective time steps and interconnected by the actions predicted for the respective time steps. One or more landmarks of this example embodiment are associated with one or more decision points based upon the states predicted for the respective time steps that define the one or more decision points. In an example embodiment, the method also includes receiving natural language input comprising one or more sentences including the sentence from which words are encoded and generating a landmark graph from the natural language input based upon the actions and the states that are predicted for respective time steps of the sentence.

In another example embodiment, an apparatus is provided that is configured to evaluate natural language input to identify actions and landmarks. The apparatus includes processing circuitry and at least one memory including computer program code instructions with the computer program code instructions configured to, when executed by the processing circuitry, cause the apparatus to encode one or more word representations in context based upon one or more other word representations in at least one of a forward direction or a backward direction within a sentence of the natural language input. The computer program code instructions are also configured to, when executed by the processing circuitry, cause the apparatus to generate an action context vector defining actions that occur during each of a plurality of time steps and to generate a state context vector defining one or more landmarks associated with each of the plurality of time steps. The computer program code instructions are further configured to, when executed by the processing circuitry, cause the apparatus to predict the state for a respective time step by defining the one or more landmarks associated with the respective time step. In this regard, the computer program code instructions configured to generate the state context vector and predict the state do so based upon a combination of a result of encoding the one or more word representations in at least one of the forward direction or the backward direction within the sentence, the one or more word representations and the state predicted during a prior time step. The computer program code instructions are also configured to, when executed by the processing circuitry, cause the apparatus to predict an action for the respective time step based on the action context vector and the state context vector.

The computer program code instructions configured to generate the action context vector in accordance with an example embodiment include computer program code instructions configured to generate the action context vector based at least partially upon a plurality of attention weights associated with respective time steps, actions and words of the sentence. In an example embodiment, the computer program code instructions configured to generate the state context vector include computer program code instructions configured to generate the state context vector based at least partially upon a plurality of attention weights associated with respective time steps, actions and words of the sentence. The computer program code instructions configured to predict the state for a respective time step in accordance with an example embodiment include computer program code instructions configured to evaluate in accordance with a sigmoid function a vector of scores indicative of whether a respective word refers to a landmark for a respective time step.

The computer program code instructions are further configured to, when executed by the processing circuitry, cause the apparatus of an example embodiment to generate a landmark graph based upon the actions and the states that are predicted for the respective time steps. In this regard, the landmark graph includes a plurality of decision points defined by the respective time steps and interconnected by the actions predicted for the respective time steps. The one or more landmarks may be associated with one or more decision points based upon the states predicted for the respective time steps that define the one or more decision points. The computer program code instructions are further configured to, when executed by the processing circuitry, cause the apparatus of an example embodiment to receive the natural language input including one or more sentences including the sentence from which words are encoded and generate a landmark graph from the natural language input based upon the actions and the states that are predicted for respective time steps of the sentence.

In a further example embodiment, a computer program product is provided for evaluating natural language input to identify actions and landmarks. The computer program product includes at least one non-transitory computer-readable storage medium having computer-executable program code instructions stored therein with the computer-executable program code instructions including program code instructions configured, upon execution, to encode one or more word representations in context based upon one or more other word representations in at least one of a forward direction or a backward direction within a sentence of the natural language input. The computer-executable program code instructions also include program code instructions configured, upon execution, to generate an action context vector defining actions that occur during each of a plurality of time steps and to generate a state context vector defining one or more landmarks associated with each of the plurality of time steps. The computer-executable program code instructions further include program code instructions configured, upon execution, to predict the state for a respective time step by defining the one or more landmarks associated with the respective time step. In this regard, the program code instructions are configured to generate the state context vector and to predict the state based upon a combination of a result of encoding the one or more word representations in at least one of the forward direction or the backward direction within the sentence, the one or more word representations and the state predicted during a prior time step. The computer-executable program code instructions also include program code instructions configured, upon execution, to predict an action for the respective time step based on the action context vector and the state context vector.

The program code instructions of an example embodiment that are configured to encode the one or more word representations include program code instructions configured to generate separate representations of each character of a word and to then combine the representations of the characters of the word to produce a first representation of the word. In relation to encoding the one or more word representations, the program code instructions of this example embodiment also include program code instructions configured to generate a second representation of the word as a whole and to combine the first and second representations of the word. In this example embodiment, the program code instructions configured to encode the one or more word representations may also include program code instructions configured to encode a result of combining the first and second representations of the word both in the forward direction based at least in part upon a subsequent word within the sentence and in the backward direction based at least in part upon a prior word within the sentence.

The program code instructions of an example embodiment that are configured to generate the action context vector include program code instructions configured to generate the action context vector based at least partially upon a plurality of attention weights associated with respective time steps, actions and words of the sentence. In an example embodiment, the program code instructions that are configured to generate the state context vector include program code instructions configured to generate the state context vector based at least partially upon a plurality of attention weights associated with respective time steps, actions and words of the sentence. The program code instructions of an example embodiment that are configured to predict the state for a respective time step include program code instructions configured to evaluate in accordance with a sigmoid function a vector of scores indicative of whether a respective word refers to a landmark for a respective time step.

The computer-executable program code instructions of an example embodiment also include program code instructions configured, upon execution, to generate a landmark graph based upon the actions and the states that are predicted for the respective time steps. In this regard, the landmark graph includes a plurality of decision points defined by the respective time steps and interconnected by the actions predicted for the respective time steps. One or more landmarks of this example embodiment are associated with one or more decision points based upon the states predicted for the respective time steps that define the one or more decision points. In an example embodiment, the computer-executable program code instructions also include program code instructions configured, upon execution, to receive natural language input comprising one or more sentences including the sentence from which words are encoded and to generate a landmark graph from the natural language input based upon the actions and the states that are predicted for respective time steps of the sentence.

In yet another example embodiment, an apparatus is provided for evaluating natural language input to identify actions and landmarks. The apparatus includes means for encoding one or more word representations in context based upon one or more other word representations in at least one of a forward direction or a backward direction within a sentence of the natural language input. The apparatus also includes means for generating an action context vector defining actions that occur during each of a plurality of time steps and means for generating a state context vector defining one or more landmarks associated with each of the plurality of time steps. The apparatus further includes means for predicting the state for a respective time step by defining the one or more landmarks associated with the respective time step. In this regard, the state context vector is generated and the state is predicted based upon a combination of a result of encoding the one or more word representations in at least one of the forward direction or the backward direction within the sentence, the one or more word representations and the state predicted during a prior time step. The apparatus also includes means for predicting an action for the respective time step based on the action context vector and the state context vector.

The means for encoding the one or more word representations in accordance with an example embodiment includes means for generating separate representations of each character of a word and means for then combining the representations of the characters of the word to produce a first representation of the word. In this example embodiment, the means for encoding the one or more word representations also includes means for generating a second representation of the word as a whole and means for combining the first and second representations of the word. In this example embodiment, the means for encoding of the one or more word representations may also include means for encoding a result of combining the first and second representations of the word both in the forward direction based at least in part upon a subsequent word within the sentence and in the backward direction based at least in part upon a prior word within the sentence.

The means for generating the action context vector in accordance with an example embodiment includes means for generating the action context vector based at least partially upon a plurality of attention weights associated with respective time steps, actions and words of the sentence. In an example embodiment, the means for generating the state context vector includes means for generating the state context vector based at least partially upon a plurality of attention weights associated with respective time steps, actions and words of the sentence. The means for predicting the state for a respective time step in accordance with an example embodiment includes means for evaluating in accordance with a sigmoid function a vector of scores indicative of whether a respective word refers to a landmark for a respective time step.

The apparatus of an example embodiment also includes means for generating a landmark graph based upon the actions and the states that are predicted for the respective time steps. In this regard, the landmark graph includes a plurality of decision points defined by the respective time steps and interconnected by the actions predicted for the respective time steps. One or more landmarks of this example embodiment are associated with one or more decision points based upon the states predicted for the respective time steps that define the one or more decision points. In an example embodiment, the apparatus also includes means for receiving natural language input comprising one or more sentences including the sentence from which words are encoded and means for generating a landmark graph from the natural language input based upon the actions and the states that are predicted for respective time steps of the sentence.

In an example embodiment, a method is provided for evaluating natural language input to generate a landmark graph. The method includes receiving the natural language input comprising one or more sentences and encoding one or more word representations in context based upon one or more other word representations in at least one of a forward direction or a backward direction within a sentence of the one or more sentences of the natural language input. The method also includes generating an action context vector and a state context vector defining actions that occur during each of a plurality of time steps and one or more landmarks associated with each of the plurality of time steps, respectively. The method further includes predicting an action and a state for a respective time step. The action is predicted based upon the action context vector and the state context vector and the state is predicted based upon a combination of a result of encoding the one or more word representations in at least one of the forward direction or the backward direction within the sentence, the one or more word representations and the state predicted during a prior time step. The method also includes generating the landmark graph from the natural language input based upon the action and the state that are predicted for respective time steps of the sentence.

The method of an example embodiment generates the landmark graph from the natural language input by generating the landmark graph so as to include a plurality of decision points defined by the respective time steps and interconnected by the actions predicted for the respective time steps. In this regard, the one or more landmarks are associated with one or more decision points based upon the states predicted for the respective time steps that define the one or more decision points. In an example embodiment, the method generates the landmark graph from the natural language input by generating the landmark graph in real time or near real time relative to receipt of the natural language input.

The method generates the action context vector in accordance with an example embodiment by generating the action context vector based at least partially upon a plurality of attention weights associated with respective time steps, actions and words of the sentence. In an example embodiment, the method generates the state context vector by generating the state context vector based at least partially upon a plurality of attention weights associated with respective time steps, actions and words of the sentence. The method of an example embodiment predicts the state for a respective time step by evaluating in accordance with a sigmoid function a vector of scores indicative of whether a respective word refers to a landmark for a respective time step.

In another example embodiment, an apparatus is provided that is configured to evaluate natural language input to generate a landmark graph. The apparatus includes processing circuitry and at least one memory including computer program code instructions with the computer program code instructions configured to, when executed by the processing circuitry, cause the apparatus to receive the natural language input comprising one or more sentences and to encode one or more word representations in context based upon one or more other word representations in at least one of a forward direction or a backward direction within a sentence of the one or more sentences of the natural language input. The computer program code instructions are also configured to, when executed by the processing circuitry, cause the apparatus to generate an action context vector and a state context vector defining actions that occur during each of a plurality of time steps and one or more landmarks associated with each of the plurality of time steps, respectively. The computer program code instructions are further configured to, when executed by the processing circuitry, cause the apparatus to predict an action and a state for a respective time step. The action is predicted based upon the action context vector and the state context vector and the state is predicted based upon a combination of a result of encoding the one or more word representations in at least one of the forward direction or the backward direction within the sentence, the one or more word representations and the state predicted during a prior time step. The computer program code instructions are also configured to, when executed by the processing circuitry, cause the apparatus to generate the landmark graph from the natural language input based upon the action and the state that are predicted for respective time steps of the sentence.

The computer program code instructions configured to generate the landmark graph from the natural language input in accordance with an example embodiment include computer program code instructions configured to generate the landmark graph so as to include a plurality of decision points defined by the respective time steps and interconnected by the actions predicted for the respective time steps. In this regard, the one or more landmarks are associated with one or more decision points based upon the states predicted for the respective time steps that define the one or more decision points. In an example embodiment, the computer program code instructions configured to generate the landmark graph from the natural language input include computer program code instructions configured to generate the landmark graph in real time or near real time relative to receipt of the natural language input.

The computer program code instructions configured to generate the action context vector in accordance with an example embodiment include computer program code instructions configured to generate the action context vector based at least partially upon a plurality of attention weights associated with respective time steps, actions and words of the sentence. In an example embodiment, the computer program code instructions configured to generate the state context vector include computer program code instructions configured to generate the state context vector based at least partially upon a plurality of attention weights associated with respective time steps, actions and words of the sentence. The computer program code instructions configured to predict the state for a respective time step in accordance with an example embodiment include computer program code instructions configured to evaluate in accordance with a sigmoid function a vector of scores indicative of whether a respective word refers to a landmark for a respective time step.

In a further example embodiment, a computer program product is provided for evaluating natural language input to generate a landmark graph. The computer program product includes at least one non-transitory computer-readable storage medium having computer-executable program code instructions stored therein with the computer-executable program code instructions including program code instructions configured, upon execution, to receive the natural language input comprising one or more sentences and to encode one or more word representations in context based upon one or more other word representations in at least one of a forward direction or a backward direction within a sentence of the one or more sentences of the natural language input. The computer-executable program code instructions also include program code instructions configured, upon execution, to generate an action context vector and a state context vector defining actions that occur during each of a plurality of time steps and one or more landmarks associated with each of the plurality of time steps, respectively. The computer-executable program code instructions further include program code instructions configured, upon execution, to predict an action and a state for a respective time step. The action is predicted based upon the action context vector and the state context vector and the state is predicted based upon a combination of a result of encoding the one or more word representations in at least one of the forward direction or the backward direction within the sentence, the one or more word representations and the state predicted during a prior time step. The computer-executable program code instructions also include program code instructions configured, upon execution, to generate the landmark graph from the natural language input based upon the action and the state that are predicted for respective time steps of the sentence.

The program code instructions configured to generate the landmark graph from the natural language input in accordance with an example embodiment include program code instructions configured to generate the landmark graph so as to include a plurality of decision points defined by the respective time steps and interconnected by the actions predicted for the respective time steps. In this regard, the one or more landmarks are associated with one or more decision points based upon the states predicted for the respective time steps that define the one or more decision points. In an example embodiment, the program code instructions configured to generate the landmark graph from the natural language input include program code instructions configured to generate the landmark graph in real time or near real time relative to receipt of the natural language input.

The program code instructions configured to generates the action context vector in accordance with an example embodiment include program code instructions configured to generate the action context vector based at least partially upon a plurality of attention weights associated with respective time steps, actions and words of the sentence. In an example embodiment, the program code instructions configured to generate the state context vector include program code instructions configured to generate the state context vector based at least partially upon a plurality of attention weights associated with respective time steps, actions and words of the sentence. The program code instructions configured to predicts the state for a respective time step in accordance with an example embodiment include program code instructions configured to evaluate in accordance with a sigmoid function a vector of scores indicative of whether a respective word refers to a landmark for a respective time step.

In yet another example embodiment, an apparatus is provided for evaluating natural language input to generate a landmark graph. The apparatus includes means for receiving the natural language input comprising one or more sentences and means for encoding one or more word representations in context based upon one or more other word representations in at least one of a forward direction or a backward direction within a sentence of the one or more sentences of the natural language input. The apparatus also includes means for generating an action context vector and a state context vector defining actions that occur during each of a plurality of time steps and one or more landmarks associated with each of the plurality of time steps, respectively. The apparatus further includes means for predicting an action and a state for a respective time step. The action is predicted based upon the action context vector and the state context vector and the state is predicted based upon a combination of a result of encoding the one or more word representations in at least one of the forward direction or the backward direction within the sentence, the one or more word representations and the state predicted during a prior time step. The apparatus also includes means for generating the landmark graph from the natural language input based upon the action and the state that are predicted for respective time steps of the sentence.

The means for generating the landmark graph from the natural language input in accordance with an example embodiment includes means for generating the landmark graph so as to include a plurality of decision points defined by the respective time steps and interconnected by the actions predicted for the respective time steps. In this regard, the one or more landmarks are associated with one or more decision points based upon the states predicted for the respective time steps that define the one or more decision points. In an example embodiment, the means for generating the landmark graph from the natural language input includes means for generating the landmark graph in real time or near real time relative to receipt of the natural language input.

The means for generating the action context vector in accordance with an example embodiment includes means for generating the action context vector based at least partially upon a plurality of attention weights associated with respective time steps, actions and words of the sentence. In an example embodiment, the means for generating the state context vector include means for generating the state context vector based at least partially upon a plurality of attention weights associated with respective time steps, actions and words of the sentence. The means for predicting the state for a respective time step in accordance with an example embodiment includes means for evaluating in accordance with a sigmoid function a vector of scores indicative of whether a respective word refers to a landmark for a respective time step.

BRIEF DESCRIPTION OF THE DRAWINGS

Figure 1:
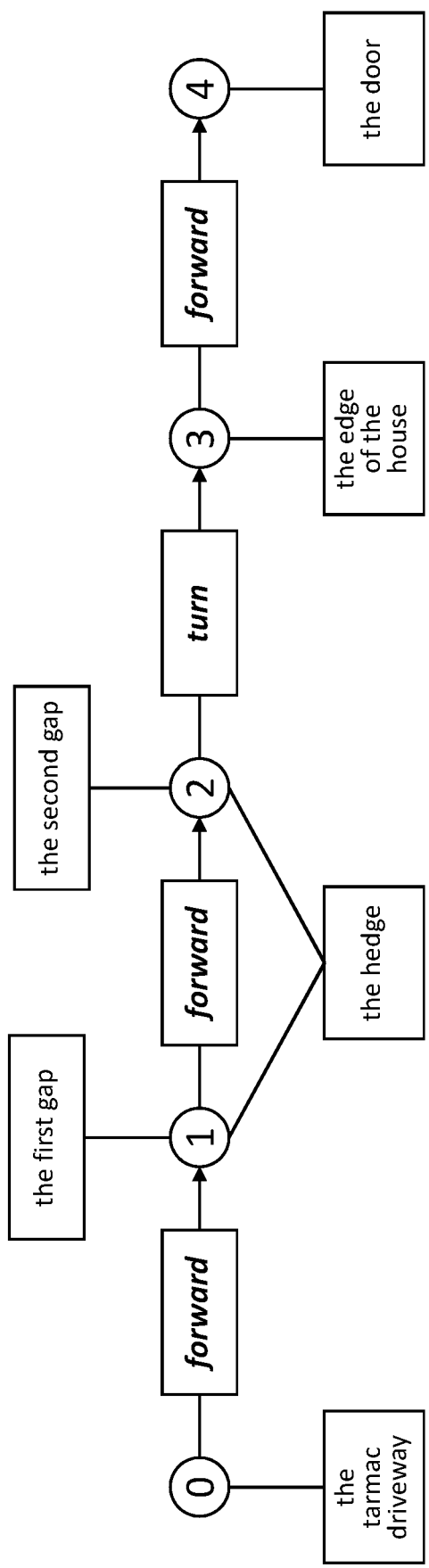
Figure 2:
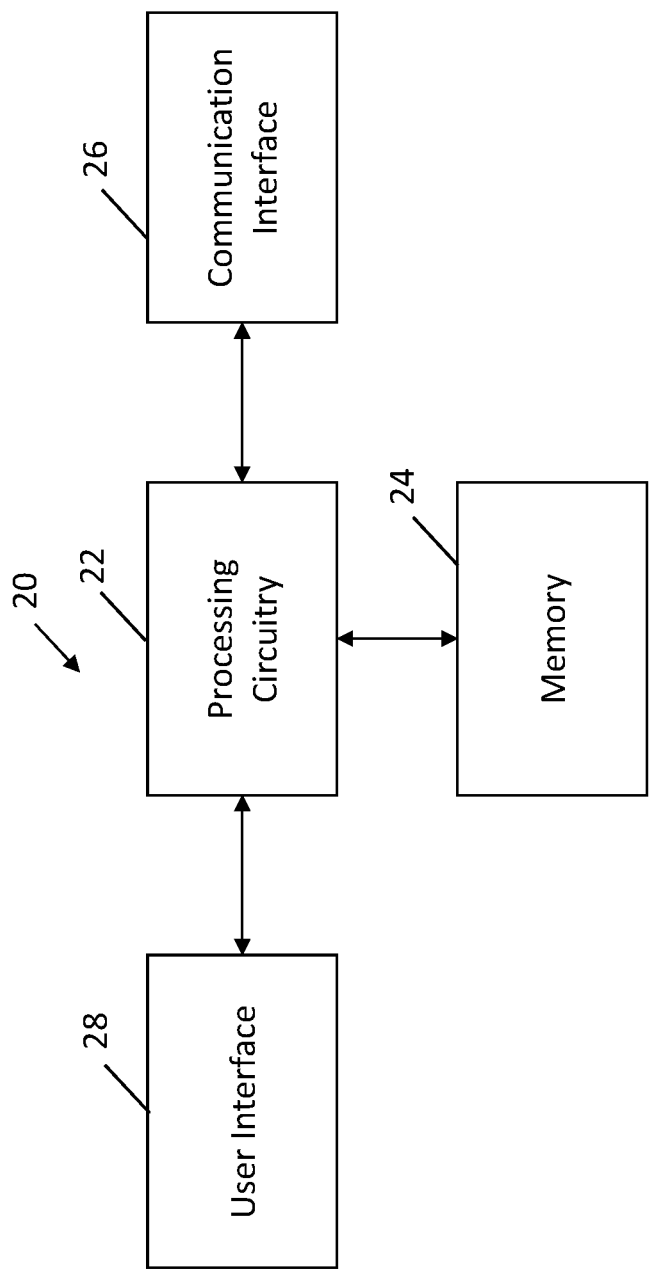
Figure 3:
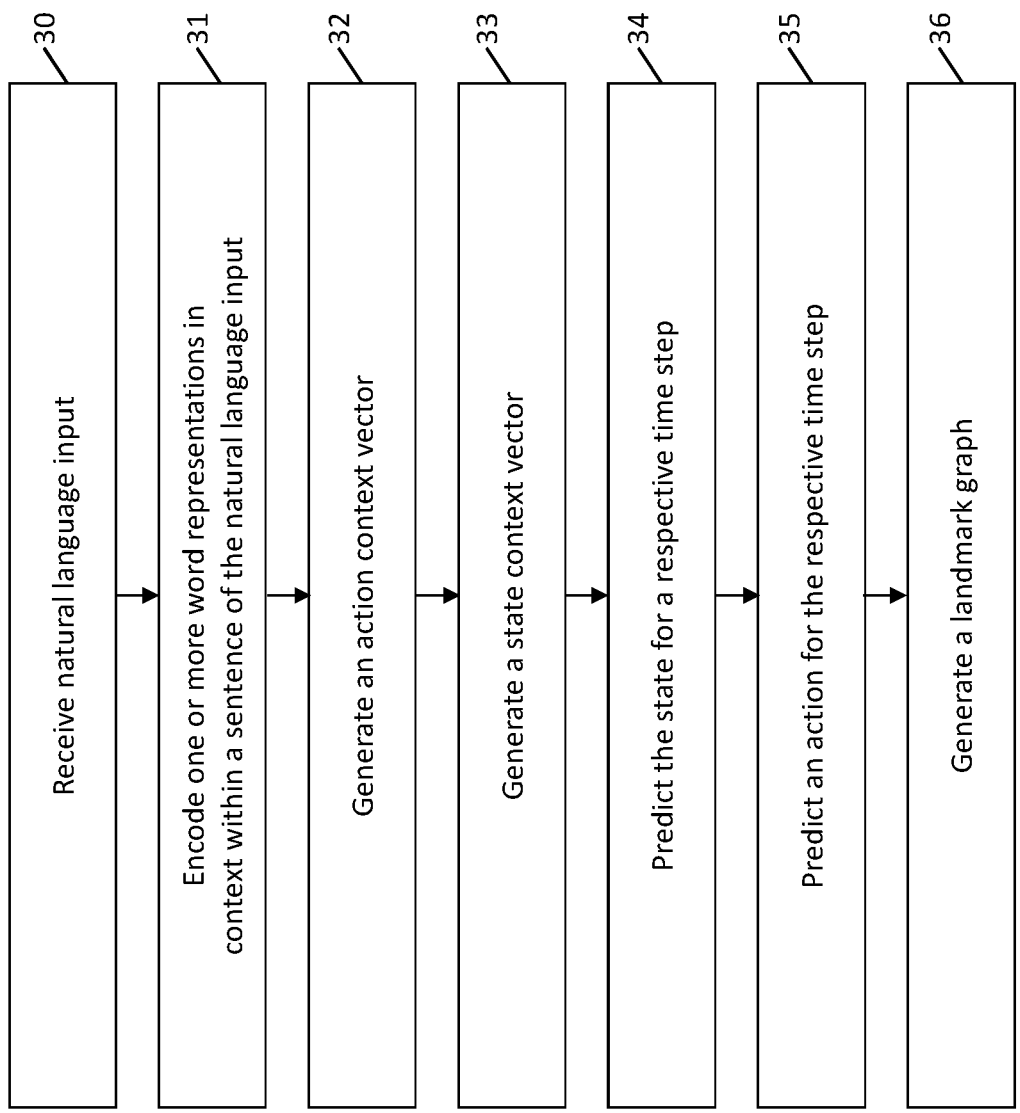
Figure 4:
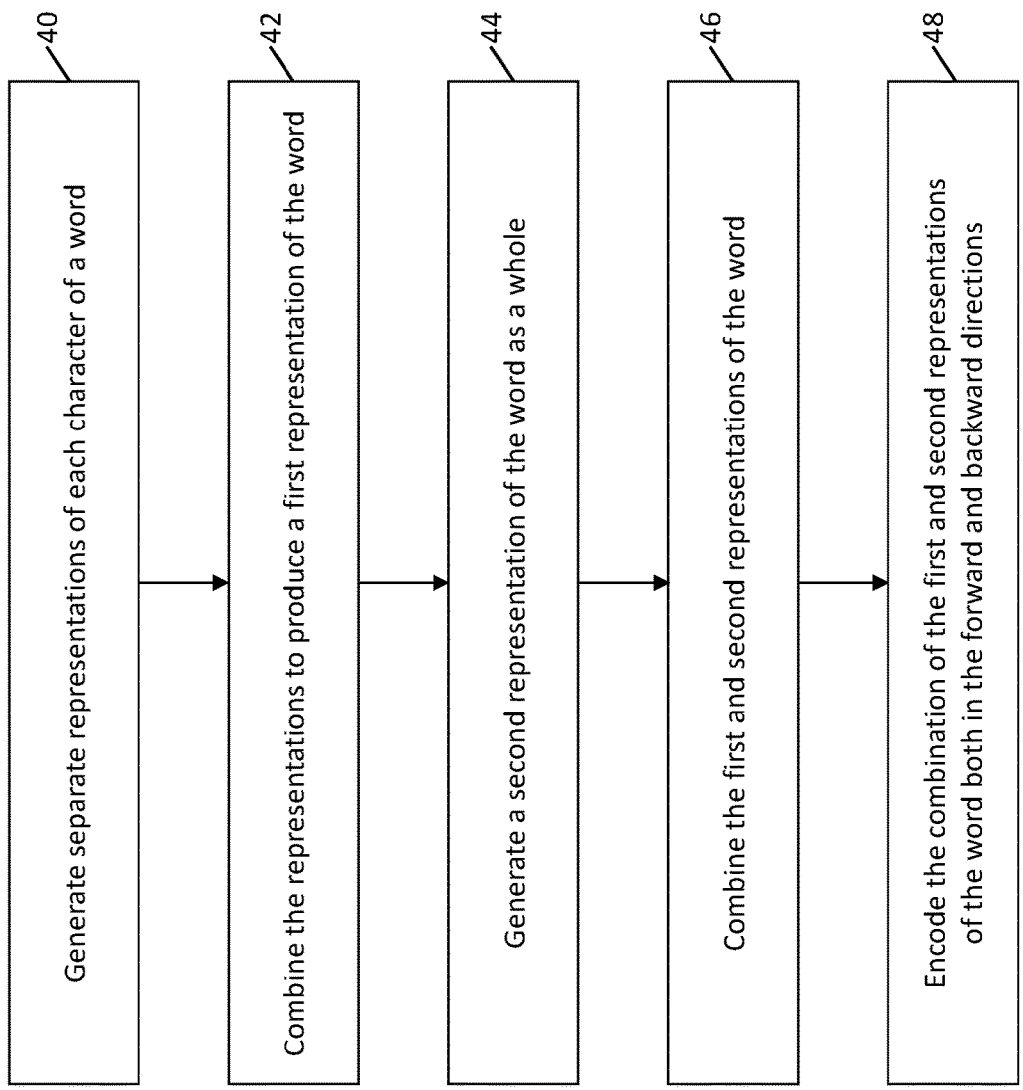
Figure 5:
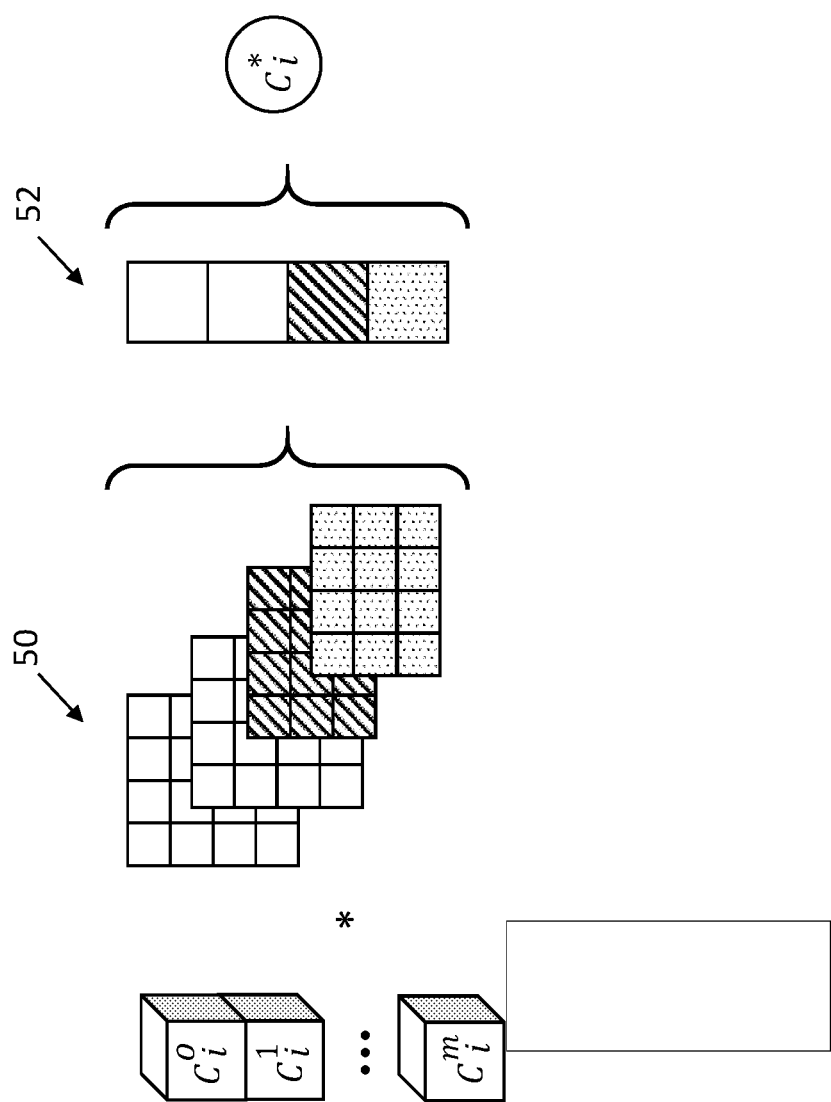
Figure 6:
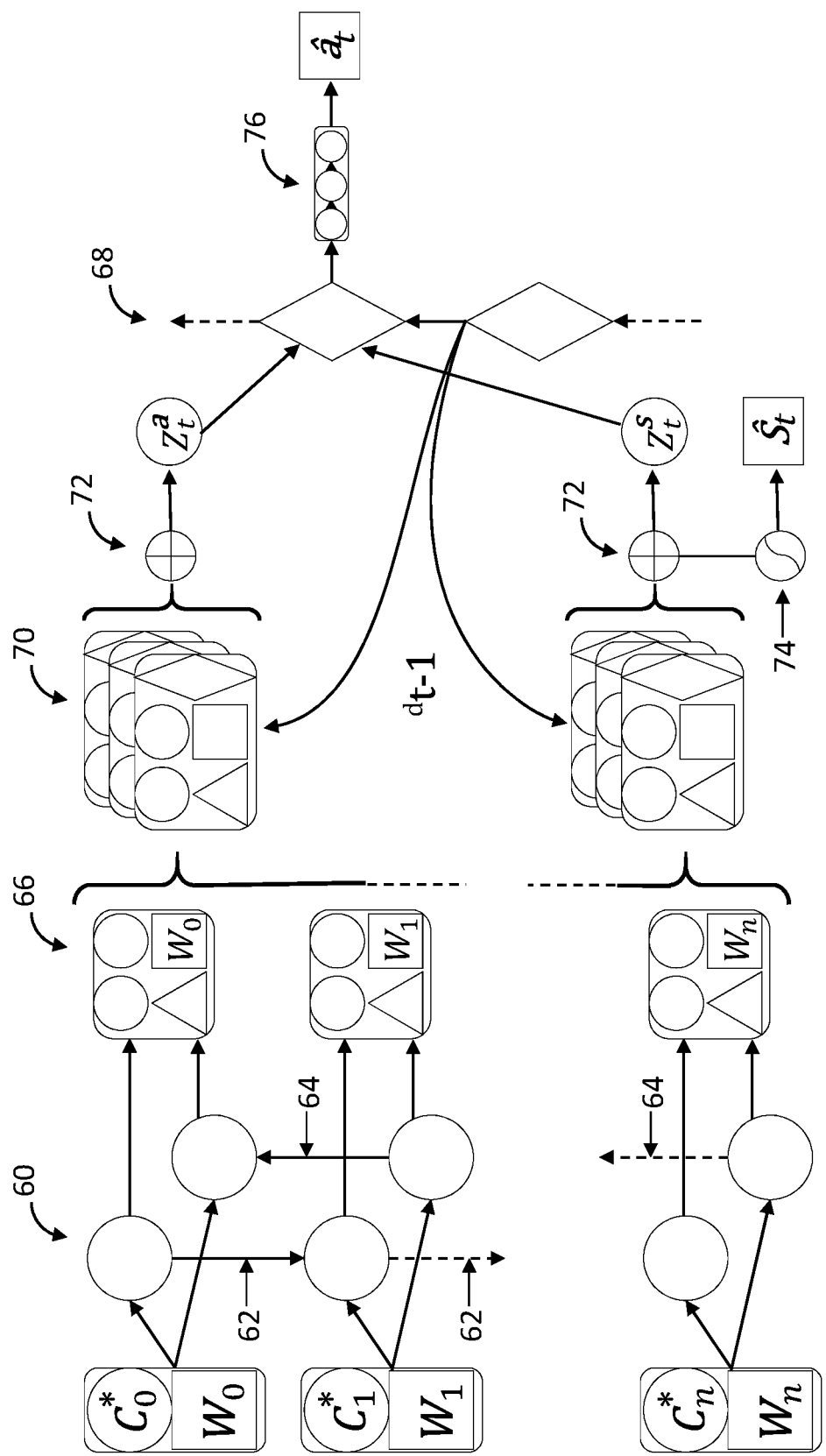

Having thus described certain embodiments of the invention in general terms, reference will now be made to the accompanying drawings, which are not necessarily drawn to scale, and wherein:

FIG. 1 is an example of a landmark graph generated in accordance with an example embodiment of the present disclosure;

FIG. 2 is a block diagram of an apparatus that may be specifically configured in accordance with an example embodiment;

FIG. 3 is a flowchart of the operations performed, such as by the apparatus of FIG. 2, for evaluating natural language input to identify actions and landmarks in accordance with an example embodiment of the present disclosure;

FIG. 4 is a flowchart illustrating operations performed, such as by the apparatus of FIG. 1, in order to encode one or more word representations in accordance with an example embodiment of the present disclosure;

FIG. 5 is a schematic representation of the operations performed for combining character representations for encoding one word representation in accordance with an example embodiment of the present disclosure; and FIG. 6 is a schematic representation of the operations performed, such as by the apparatus of FIG. 2, to evaluate natural language input and to identify actions and landmarks from the natural language input in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to evaluate natural language input in order to identify actions and landmarks that are mentioned in the natural language input. Based upon the identification of the actions and landmarks, a landmark graph may be generated from the natural language input. In an example embodiment, the natural language input provides directions or instructions relative to at least a portion of a route to be navigated, such as the final portion of a route referred to as the last meter, although the final portion of the route may actually extend over a more substantial distance, such as 10 meters, 20 meters, 50 meters, 100 meters or more. Thus, the landmark graph provides a graphical depiction of the final portion of a route in a manner as that is intuitive and, as a result, more readily comprehensible to a person endeavoring to reach the intended destination. In this regard, the landmark graph is more intuitive since the graph identifies one or more landmarks associated with various decision points and also identifies the actions to be taken to proceed from one decision point to the next decision point. The identification and reliance upon landmarks in order to navigate, particularly in more complex settings, is more consistent with the manner in which human instinctively navigate in comparison to the geometric spatial representations utilized by conventional navigation maps such that the landmark graph increases the efficiency with which a person navigates the final portion of a route and also increases the likelihood of success in terms of reaching the destination.

By way of example, the natural language input may be as follows: "take the tarmac driveway, pass the first gap in the hedge, then take the second gap and walk along the edge of the house. The door is on the left-hand side." As described below, the method, apparatus and computer program product of an example embodiment are configured to evaluate this natural language input and to identify actions and landmarks within the natural language input. Based upon the actions and landmarks that are identified, the method, apparatus and computer program product of an example embodiment are also configured to generate a landmark graph as shown in FIG. 1. In this example of a landmark graph, the decision points are designated by numerals, such as 0, 1, 2, 3 and 4, and the lines connecting the decision points are associated with actions, such as forward, turn, etc. Landmarks are also associated with the decision points. For example, "the tarmac driveway" is associated with decision point 0 and "the hedge" is associated with both decision points 1 and 2. Other examples of landmarks include "the first gap", "the second gap", "the edge of the house" and "the door". Based upon the landmark graph, a person may navigate this portion of a route, based upon the natural language directions that were provided, in a manner that is intuitive as a result of the identification of various landmarks and the actions that are instructed to be taken from one decision point associated with one or more landmarks to another decision point associated with one or more landmarks.

As exemplified by FIG. 1, the landmark graph includes two types of semantically meaningful nodes, namely, decision points and landmarks, and two types of edges that provide spatial information. A first type of edge associates a decision point with a nearby landmark and a second type of edge extends between decision points, indicating the action to be taken therebetween.

The landmark graph that is generated by the method, apparatus and computer program product of an example embodiment may be utilized in a wide variety of applications. For example, the landmark graph may be utilized in conjunction with delivery services in order to facilitate the efficient and accurate delivery of a product to a destination. In this example embodiment, the natural language input may be provided by the intended recipient of the product or by a prior delivery person who delivered another product to the same destination at an earlier point in time. As another example, the landmark graph may be utilized by a driver, such as taxi driver, the driver of a rideshare vehicle or the like, in order to allow the driver to arrive at the intended destination in an efficient and accurate manner in order to pick up a passenger. In this example, the natural language input may be provided by the passenger who has called the car or by a prior driver who picked up a passenger at the same location. Still further, a landmark graph may be utilized by a person intending to reach a destination for any of various purposes, such as to visit, to perform services or the like, with the natural language input providing the directions from which the landmark graph is constructed being provided by a person who lives at the location or a person who previously visited or worked at the location. While several examples illustrating the utility of a landmark graph have been provided, the method, apparatus computer program product of an example embodiment may be utilized in any number of other applications that would benefit from improved navigation over at least a portion of a route, such as the final portion of a route.

While described herein in conjunction with navigation by a person to an intended destination utilizing the landmark graph, the landmark graph that is constructed in accordance with an example embodiment may also be utilized by a robot, an autonomous or semi-autonomous vehicle or other automated form of transport. Thus, reference herein to reliance upon the landmark graph to facilitate navigation by a person is provided by way of example, but not of limitation.

Referring now to FIG. 2, an apparatus 20 that may be specifically configured to evaluate natural language input and to identify actions and landmarks therefrom is depicted. The apparatus configured may be embodied by any of a wide variety of computing devices, such as a server, a computer workstation, a personal computer, a distributed network of computing devices or the like. Alternatively, the apparatus may be embodied by a mapping system, a navigation system or the like that are configured to utilize landmark graphs in concert with other navigational tools in order to improve navigation over a portion of a route, such as the final portion of the route. Regardless of the type of computing device that embodies the apparatus, the apparatus of an example embodiment includes, is associated with or is otherwise in communication with processing circuitry 22, memory 24 and optionally a communication interface 26 and/or a user interface 28.

In some embodiments, the processing circuitry 22 (and/or co-processors or any other processors assisting or otherwise associated with the processing circuitry) may be in communication with the memory device 24 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor.

Additionally or alternatively, the memory device could be configured to store instructions for execution by the processing circuitry.

The processing circuitry 22 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as to receive natural language input from a device, such as a mobile device or other type of user or client device, and/or to provide output in the form of a landmark graph to a device, e.g., a navigation device, such as a mapping system or a navigation system onboard a vehicle or any of a variety of personal navigation systems embodied by a mobile device or other type of user or client device. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 20 of an example embodiment may also optionally include or otherwise be in communication with a user interface 28. The user interface may include a touch screen display, a speaker, a microphone, physical buttons, and/or other input/output mechanisms. In an example embodiment, the processing circuitr 22 may comprise user interface circuitry configured to control at least some functions of one or more input/output mechanisms. The processing circuitry and/or user interface circuitry may be configured to control one or more functions of one or more input/output mechanisms through computer program instructions (for example, software and/or firmware) stored on a memory accessible to the processing circuitry (for example, memory device 24, and/or the like).

Referring now to FIG. 3, the operations performed, such as by the apparatus 20 of FIG. 2, are depicted. As shown in block 30, the apparatus of an example embodiment includes means, such as the processing circuitry 22, the communication interface 26 or the like, for receiving natural language input that includes one or more sentences. As described in the foregoing examples, the natural language input may be provided by a variety of different people including the resident of a particular location, the business owner or employee of a business at a particular location, a delivery person or service provider who previously visited the location, a driver who previously picked up a passenger at the location or the like. The natural language input may be free-form without any external signals, such as images, sensor data or the like, thereby facilitating the provision of the natural language input. The natural language input may be captured and provided in various manners. For example, the natural language input may initially be provided in an audible form that is captured or recorded and then transcribed or otherwise subjected to a voice-to-text translation, either automatically utilizing, for example, voice recognition technology, or manually to create a textual representation of the natural language input. Although the natural language input may be captured in various manners, a voice recorder may be utilized to capture the natural language input or a user device or other client device, such as an application executed by a smart phone or other personal communications device, may be utilized to capture the natural language input. However, the natural language input need not be initially provided in an audible form and may, instead, be provided initially in a textual form, such as via a text message or the like.

In some embodiments, the apparatus 20 is configured to initially capture the natural language input, such as via the user interface 28 of the apparatus. The user interface may be configured to capture the natural language in put in any one of various manners, such as by providing an interface, such as a keyboard and/or a touch screen display, via which textual input may be provided or by capturing audible input, such as with a microphone. Once captured, the natural language input is received by the processing circuitry 22, such as from the user interface. Alternatively, the natural language input may be initially captured by a device, such as a user device or other client device, that is distinct from the apparatus and then provided to the apparatus via the communication interface 26. In this example embodiment, the natural language input is then received by the processing circuitry from the communication interface. Still further, the natural language input may have been previously provided and stored, such as by the memory 24 or another memory or database with which the apparatus is in communication. In this example, the processing circuitry is configured to receive the natural language input from the memory 24 or from the other memory or database that stores the natural language input, such as via the communications interface.

As shown in block 31 of FIG. 3, the apparatus 20 also includes means, such as the processing circuitry 22 or the like, configured to encode one or more word representations of words from the natural language input in context, such as in context relative to other words of a sentence provided by the natural language input. As described in more detail below, the apparatus, such as the processing circuitry, is configured to encode the one or more word representations in context based upon one or more other word representations in at least one of a forward direction or backward direction and, in some embodiments, in both the forward direction and the backward direction, within a sentence of the natural language input. Based upon the sentence input, individual words are identified and then represented in accordance with an example embodiment as a combination of learned character-level features and dense embeddings as described below.

As shown in more detail in FIG. 4, the apparatus 20, such as the processing circuitry 22, is configured to generate separate representations for each character of a word and to then combine the representations of the characters of the word to produce a first representation of the word. See blocks 40 and 42. In an example embodiment, the apparatus, such as the processing circuitry, is also configured to generate a second representation of the word as a whole, that is, by generating a representation of the word itself without processing the word on a character-level basis. See block 44. Although the second representation of the word as a whole may be generated in various manners, the apparatus, such as the processing circuitry, of an example embodiment is configured to utilize a model, such as a pretrained Word2Vec model, configured to learn a vector representation of a word, termed a word embedding in which words with similar meanings are closer together than unrelated words, to generate the second representation of the word. The apparatus, such as the processing circuitry, may then be configured to combine the first representation of the word, such as $c^*_i$, and the second representation of the word $w_i$, such as the result of subjecting the word to a Word2Vec model, such as by concatenating the first and second representations of the word. As shown in block 46 of FIG. 4, the apparatus, such as the processing circuitry, is also configured to combine the first and second representations of the word, such as by concatenating the first and second representations of the word.

As shown in FIG. 5 with respect to the encoding of one or more word representations in context, the apparatus 20, such as the processing circuitry 22, is configured to generate separate representations of each character of a word from a sentence of the natural language input. In an example embodiment, each character $c_i^j$ of a word $w_i$ is represented as a vector, such as a one hot vector, that may optionally be combined with one or more explicit character-level features, such as an indication that the character is a numerical digit or is an alpha character. In this regard, the subscript i designates the particular word from within a sentence of the natural language input and the superscript j designates the particular character of the word having m total characters.

As shown in FIG. 5, the apparatus, such as the processing circuitry, of an example embodiment may also include a convolutional neural network including a plurality of convolutional filters 50 to which the representations of the characters $c_i^j$ are provided. The convolutional filters of the convolutional neural network are swept over the representations of the characters of a respective word. As shown in FIG. 5, the apparatus, such as the processing circuitry, of this example embodiment may also be configured to subject the output from the convolutional filters to a sample-based discretization process, such as max-pooling 52, intended to down-sample the output from the convolutional filters and to reduce its dimensionality, thereby producing the first representation of the word in the form of fixed-length character-level features for the word as designated $c^*_i$. This first character-based representation of a work allows for the representation of a wide variety of words including new words, misspelled words and words having a common root but different suffixes.

As noted above in conjunction with block 31 of FIG. 3 and as shown in block 48 of FIG. 4, the apparatus 20, such as the processing circuitry 22, is configured to take into account one or more other word representations in at least one of a forward direction or a backward direction within a sentence of the natural language input in order to encode the one or more word representations in context. In the example embodiment of FIG. 6, the apparatus, such as the processing circuitry, is configured to encode the result of combining the first and second representations of a word both in the forward direction, based at least in part upon a subsequent word within the sentence, and in the backward direction, based at least in part upon a prior word within the sentence.

As shown, for example, in conjunction with FIG. 6, the combination of the first and second representations of the word designated $c^*_i$ and $w_i$, respectively, are combined, such as by being concatenated, and are then provided to an encoder 60 which may be embodied by a recurrent neural network (RNN), such as a bidirectional long short-term memory (LSTM) encoder embodied by the apparatus 20, such as the processing circuitry 22, to encode the combination of the first and second representations of a word in context within the sentence from the natural language input. In the illustrated embodiment, the bidirectional LSTM encoder is configured to receive not only the combination of the first and second representations of a word, but also information regarding a prior word (as exemplified by the arrows 62 from an encoder state or output $e_i^{bw}$ associated with a word having a smaller i value than the word being encoded) and information regarding a subsequent word (as exemplified by the arrows 64 from an encoder state or output $e_i^{fw}$ associated with a word having a larger i value than the word being encoded) such that the word being encoded is encoded in context taking into account other words in the sentence prior to and subsequent to the word being encoded. The apparatus, such as the processing circuitry and, in the example embodiment of FIG. 6, the bidirectional LSTM encoder embodied by the processing circuitry, generates a combination, such as a concatenation, of the first and second representations of the word as well as representations of the word in context, based upon information regarding prior and subsequent words within the sentence, as shown at 66 of FIG. 6. In an example embodiment, the combination generated by the encoder also includes additional information, such as a tag indicating the part of speech represented by the word or the like. Although encoded in context based upon other words prior or subsequent to the word being encoded, the results generated by the encoder are each still representative of a single word within the sentence of the natural language input.

As shown in block 32 of FIG. 3, the apparatus 20 of an example embodiment also includes means, such as the processing circuitry 22 or the like, configured to generate an action context vector $z_t^a$ defining actions a that occur during each of a plurality of time steps t. In this regard, the time steps are associated with and defined by the decision points with each time step being defined as that extent of time extending between an adjacent pair of decision points. In an example embodiment, a predefined set of actions are defined. Although various actions may be defined in other example embodiments, the actions of the embodiment described herein take one of nine labels, namely, stand, move, forward, turn left, turn right, ascend, descend, turn and stop. Ascension and descension are included as the natural language input of an example embodiment frequently includes the mention of stairs. Additionally, relatively ambiguous actions, such as turn and move, are provided for instances in which the action is at least somewhat unclear from the natural language input. The stand action is included for internal representation purposes, such as in instances in which only landmark verification is necessary during a time step, and the stop action is included to indicate path termination, such as at the destination.

In order to generate the action context vector, the apparatus 20, such as the processing circuitry 22, of an example embodiment is configured to combine the one or more word representations of a respective word, such as the combined, e.g., concatenated, first and second representations of the respective word, with the forward and backward encoder outputs $e_i:=[e_i^{fw}, e_i^{bw}]$ and an output from a decoder 68 from the prior time step designated $d_t-1$ which serves to tile across input words, as shown at 70. In an example embodiment, the apparatus, such as the processing circuitry, also combines, such as concatenates, one or more explicit word features $\Phi_i$, such as a part-of-speech tag, to this combined representation of a respective word i.

In an example embodiment, the apparatus 20, such as the processing circuitry 22, is also configured to generate the action context vector based at least partially upon a plurality of attention weights $\alpha_{ti}^a$ (designated as 72 in FIG. 6) associated with respective time steps t, actions a and words $w_i$ of the sentence. In an example embodiment, the apparatus, such as the processing circuitry, is configured to generate the action context vector for the sentence by applying the attention weights $\alpha_{ti}^a$ to the combination of the one or more word representations of a respective word, the forward and backward encoder outputs $e_i:=[e_i^{fw}, e_i^{bw}]$ and an output $d_t-1$ from the decoder from the prior time step as follows:

$$z_t^a = \sum_i \alpha_{ti}^a [w_i, e_i, \phi_i]$$

In this example embodiment, the apparatus 20, such as the processing circuitry 22, is configured to learn the attention weights $\alpha_{ti}^a$, such as in accordance with the following:

$$\alpha_{ti}^a = \frac{\exp(\beta_{ti}^a)}{\sum_i \exp(\beta_{ti}^a)}$$

$$\beta_{ti}^a = v^a \tanh(W^a d_{t-1} + U^a w_i + V^a [e_i, \phi_i])$$

wherein $v^a$, $W^a$, $U^a$ and $V^a$ are learned parameters. In this regard, the apparatus, such as the processing circuitry, is configured to learn $\beta_{ti}^a$ based upon a determination as to whether a word $w_i$ is helpful in regards to determining the next action.

The resulting action context vector $z_t^a$ of an example embodiment serves as a sentence-wide importance-weighted average of the representation of each word. In this regard, the action context vector $z_t^a$ is the sentence-wide sum of the product of attention terms and a word representation, namely, $[w_i, e_i, \Phi_i]$. In an example embodiment, the action context vector $z_t^a$ provides a weighted average since the attention term has a learned weighting, based on word representations and decoder states, of the relative importance of the word for determining an action such that the sum of the attention terms for the words of a sentence equals 1.

As shown in block 33, the apparatus 20 of an example embodiment also includes means, such as the processing circuitry 22 or the like, configured to generate a state context vector $z_t^s$ defining one or more landmarks s associated with each of the plurality of time steps t. In an example embodiment, the apparatus, such as the processing circuitry, is configured to generate the state context vector in a comparable manner to that described above with respect to the action context vector. For example, in order to generate the state context vector, the apparatus, such as the processing circuitry, of an example embodiment is configured to combine the one or more word representations of a respective word, such as the combined, e.g., concatenated, first and second representations of the respective word with the forward and backward encoder outputs $e_i:=[e_i^{fw}, e_i^{bw}]$ and an output from a decoder 68 from the prior time step designated $d_t-1$, as shown at 70. The apparatus, such as the processing circuitry, of this example embodiment is also configured to generate the state context vector based at least partially upon a plurality of attention weights $\alpha_{ti}^s$ associated with respective time steps t, actions a and words $w_i$ of the sentence, such as by applying the attention weights $\alpha_{ti}^s$ to the combination of the one or more word representations of a respective word, the forward and backward encoder outputs $e_i:=[e_i^{fw}, e_i^{bw}]$ and an output $d_t-1$ from the decoder from the prior time step as follows:

$$z_t^s = \sum_i \alpha_{ti}^s [w_i, e_i, \Phi_i]$$

In this example embodiment, the apparatus 20, such as the processing circuitry 22, is configured to learn the attention weights $a_{ti}^s$, such as in accordance with the following:

$$\alpha_{ti}^s = \frac{\exp(\beta_{ti}^s)}{\sum_i \exp(\beta_{ti}^s)}$$

$$\beta_{ti}^s = v^s \tanh(W^s d_{t-1} + U^s w_i + V^s (e_i, \Phi_i])$$

wherein $v^s$, $W^s$, $U^s$ and $V^s$ are learned parameters. In this regard, the apparatus, such as the processing circuitry, is configured to learn the attention mechanism $\beta_{ti}^s$ to determine whether a word $w_i$ refers to a landmark, as opposed to indicating an action to be taken as described above in conjunction with the generation of the action context vector. In this regard, landmarks are world states represented by nouns or noun phrases within the natural language input. In other words, the attention mechanism $\beta_{ti}^s$ for a word is a scalar value indicating the importance to the state task of the word i at time t. From the attention mechanisms for individual words of a sentence, the apparatus, such as the processing circuitry, is configured to define a vector $\beta_t^s$ that represents the word scores for the entire sentence and that may be defined as $[\beta_{t0}^s, \beta_{t1}^s, \ldots \beta_{tn}^s]$ for a sentence formed of n+1 words. While a vector $\beta_t$ is learned in conjunction with the generation of each of the action state vector and the landmark state vector, the vectors $\beta_t$ are different since the words are evaluated by the apparatus, such as the processing circuitry, in conjunction with the generation of the action context vector and the state context vector to identify the relative importance of the words in relation to the identification of an action or a landmark, respectively. Thus, the vector $\beta_t^a$ is learned with respect to the generation of an action context vector and a vector $\beta_t^s$ is learned with respect to the generation of a state context vector. The apparatus, such as the processing circuitry, does not rely upon pre-defined landmarks as input to the process. Instead, the apparatus, such as the processing circuitry, is configured to identify landmarks from the natural language input and to provide the landmarks, such as in the form of a landmark graph, as an output from the process.

As with the action context vector, the state context vector $z_t^s$ of an example embodiment serves as a sentence-wide importance-weighted average of the representation of each word. In this regard, the state context vector $z_t^s$ is the sentence-wide sum of the product of attention terms and a word representation, namely, $[w_i, e_i, \Phi_i]$. In an example embodiment, the state context vector $z_t^s$ provides a weighted average since the attention term has a learned weighting, based on word representations and decoder states, of the relative importance of the word for determining a state such that the sum of the attention terms for the words of a sentence equals 1.

As shown in block 34 of FIG. 3, the apparatus 20 of an example embodiment also includes means, such as the processing circuitry 22 or the like, configured to predict the state $\hat{s}_t$ for a respective time step, such as by defining one or more landmarks associated with the respective time step. In an example embodiment depicted in FIG. 6, the apparatus, such as the processing circuitry, is configured to apply the attention weights $a_{ti}^s$ to a combination of the one or more word representations of a respective word, the forward and backward encoder outputs $e_i := [e_i^{fw}, e_i^{bw}]$ and an output $d_t-1$ from the decoder 68 from the prior time step as described above in conjunction with the generation of the state context vector and to generate the vector $\beta_t^s$, termed a vector of scores, that is, in turn, provided to a sigmoid function 74 in order to predict the state $\hat{s}_t$ for a respective time step. Thus, the apparatus, such as the processing circuitry of this example embodiment is configured both to predict the state for a respective time step and to generate the state context vector in a manner that is informed by the output of a decoder that is utilized in order to predict actions for the various time steps, but is not a product of the action decoder. In an example embodiment, the apparatus, such as the processing circuitry, is configured to predict the state for a respective time step by evaluating in accordance with the sigmoid function a vector of scores $\beta_t^s$ indicative of whether a respective word refers to a landmark for the respective time step. All positive values provided by the sigmoid function are considered to indicate that a word refers to an entity with these words then being grouped naïvely to produce states. In this regard, for each word i that has a positive score (and which therefore refers to a landmark), the apparatus, such as the processing circuitry, determines that: (i) word i begins a new landmark phrase if i=0, (ii) word I begins a new landmark phrase if word i−1 had a non-positive score, that is, a score that is less than or equal to 0, and (iii) word I is added to a prior landmark phrase in an instance in which word i−1 had a positive score. Following this process, a naively-grouped collection of landmark phrases is produced. As such, the apparatus, such as the processing circuitry, is configured to generate the predicted states $\hat{s}_t$ for each of the plurality of time steps identified by a sentence of the natural language input. In this regard, a predicted state $\hat{s}_t$ refers to a (possibly empty) collection of landmark phrases for time step t, such as the naively-grouped collection of landmark phrases produced as described above which is a state.

As shown in block 35 of FIG. 3, the apparatus 20 of an example embodiment also includes means, such as the processing circuitry 22 or the like, configured to predict an action for the respective time step based on the action context vector $z_t^a$ and the state context vector $z_t^s$. In an example embodiment depicted in FIG. 6, the apparatus, such as the processing circuitry, embodies the decoder 68, such as an LSTM decoder, responsive to the action context vector and the state context vector for a respective time step. The apparatus, such as the processing circuitry, of this example embodiment may also embody a discriminative model, such as a linear chain conditional random field (CRF) layer 76, which receives the output of the decoder and determines the most likely action $\hat{a}_t$ based both on the label scores and the actions predicted for prior time steps. In this regard, the CRF layer is configured to predict sequences of labels based on sequences of inputs, such as based not only on the individual probability that a given input should take a particular output, but also on the outputs that have been previously produced in the sequence, thereby accounting for the fact that certain actions are more likely to follow some actions rather than other actions. In other embodiments, the apparatus, such as the processing circuitry, may be configured to predict the action for a respective time step in different manners. For example, the apparatus, such as the processing circuitry, of another embodiment may be configured to determine the highest scoring probability from among the outputs of the decoder at each time step, such as by applying a soft max function to the decoder outputs, and to then identify the output with the highest scoring probability as the predicted action for a respective time step.

As shown in block 36 of FIG. 3, the apparatus 20, such as the processing circuitry 22, of an example embodiment is also configured to generate a landmark graph representative of a sentence from the natural language input based upon the actions and the states that are predicted for the respective time steps of the sentence. As described above in conjunction with the example of FIG. 1, the landmark graph includes a plurality of decision points defined by respective time steps. In this regard, the time steps extend between adjacent pairs of decision points. The plurality of decision points of the landmark graph are interconnected by actions predicted for the respective time steps. One or more landmarks are associated with one or more decision points based upon the states predicted for the respective time steps that define the one or more decision points. Based upon the resulting landmark graph, navigation, such as by human or robot, over at least a portion of a route, such as the final portion, e.g., the last meter, of a route may be performed more efficiently and accurately.

By way of example, given predicted actions and state sequences â and ŝ, the apparatus 20, such as the processing circuitry 22, is configured to construct the landmark graph utilizing the following approach in which T refers to the length of the predicted sequence, that is, T equals |â|, bounded either by the maximum path link or the prediction of the <STOP> action.

Add a root node as step 0
For t in T
    Add a new step linked to the previous step with $\hat{a}_t$
    For each landmark specified in $\hat{s}_t$
    If the landmark already exists, link it to the newly added step
    Else, create a new landmark node and link it to the newly added step Although described heretofore in a manner that identifies landmark proximity, the apparatus 20, such as the processing circuitry 22, of an example embodiment may also be configured to augment the landmark graph with labeled edges between the landmarks and the decision points to indicate a relative direction therebetween, such as to the right of, in front of, etc.

In relation to training of the apparatus 20 to predict a sequence of actions â and a sequence of world states ŝ given a sequence of context vectors $z_t := [z_t^a, z_t^s]$, the apparatus, such as the processing circuitry 22, of an example embodiment utilizes a negative log likelihood loss. For actions, the negative log likelihood loss may be defined as follows:

$$\mathcal{L}^a = -\Sigma \log P(\hat{a}|z)$$

The negative log likelihood loss of this example embodiment utilizes the CRF sequence probabilities as defined below:

$$P(\hat{a}|z) = \frac{1}{z} \exp\left(\sum_t^T u_t^a + \sum_t^{T-1} \Theta_{a_t, a_{t+1}}\right)$$

In this regard $u_t^a$ is the unary score for context vector $z_t$ taking action $a_t$, $\Theta_{a_t, a_{t+1}}$ refers to the probability that action $a_{t+1}$ follows action $a_t$ and $\zeta$ is a normalization term, such as the sum of combinations over all possible actions at each time step.

For states, the apparatus 20, such as the processing circuitry 22, may be trained utilizing a sigmoid cross entropy loss as follows:

$$\mathcal{L}^s = -\sum_t \sum_i \max(\beta_{ti}^s, 0) - \beta_{ti}^s s_{ti} + \log(1 + \exp(-|\beta_{ti}^s|))$$

wherein $s_{ti}$ refers to the binary world state label for word $w_i$ at time step t. The resulting model is then trained utilizing the joint loss defined as follows:

$$\mathcal{L} = \mathcal{L}^a + \mathcal{L}^s$$

In this regard, the model is trained so as to minimize the joint loss.

A method, apparatus 20 and computer program product are therefore provided in order to evaluate natural language input, such as on a real time or near real time basis, to identify actions and landmarks, such as in conjunction with the generation of a landmark graph. The landmark graph permits people or robots to better navigate, particularly over the final portion, such as the last few meters, of a route, thereby increasing the likelihood of reaching the intended destination. In this regard, the natural language input may provide directions over the final portion of a route to an intended destination in the same manner in which people intuitively navigate, that is, based upon landmarks. Thus, the identification of actions and landmarks from their natural language input and the generation of a landmark graph facilitates navigation over the final portion of the route in a manner consistent with the directions provided via the natural language input and in a manner more readily understandable by people. The landmark graph and/or the directions represented by the landmark graph may be provided to a person in various manners, such as via the user interface 28, such as a display and/or speakers of a user device or other client device, via an augmented reality display or the like. The resulting landmark graph may therefore be utilized in a wide variety of applications, such as by a delivery person, a driver, a service provider or any other person or robot attempting to reach a particular destination.

FIGS. 3 and 4 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for evaluating natural language input to identify actions and landmarks, the method comprising:
    encoding one or more word representations in context based upon one or more other word representations in at least one of a forward direction or a backward direction within a sentence of the natural language input;
    generating an action context vector defining actions that occur during each of a plurality of time steps;
    generating a state context vector defining one or more landmarks associated with each of the plurality of time steps;
    predicting the state for a respective time step by defining the one or more landmarks associated with the respective time step, wherein generating the state context vector and predicting the state are based upon a combination of a result of encoding the one or more word representations in at least one of the forward direction or the backward direction within the sentence, the one or more word representations and the state predicted during a prior time step; and
    predicting an action for the respective time step based on the action context vector and the state context vector.

2. A method according to claim 1 wherein encoding the one or more word representations comprises:
    generating separate representations of each character of a word and then combining the representations of the characters of the word to produce a first representation of the word;
    generating a second representation of the word as a whole; and
    combining the first and second representations of the word.

3. A method according to claim 2 wherein encoding the one or more word representations further comprises encoding a result of combining the first and second representations of the word both in the forward direction based at least in part upon a subsequent word within the sentence and in the backward direction based at least in part upon a prior word within the sentence.

4. A method according to claim 1 wherein generating the action context vector comprises generating the action context vector based at least partially upon a plurality of attention weights associated with respective time steps, actions and words of the sentence.

5. A method according to claim 1 wherein generating the state context vector comprises generating the state context vector based at least partially upon a plurality of attention weights associated with respective time steps, actions and words of the sentence.

6. A method according to claim 1 wherein predicting the state for a respective time step comprises evaluating in accordance with a sigmoid function a vector of scores indicative of whether a respective word refers to a landmark for a respective time step.

7. A method according to claim 1 further comprising generating a landmark graph based upon the actions and the states that are predicted for the respective time steps, wherein the landmark graph comprises a plurality of decision points defined by the respective time steps and interconnected by the actions predicted for the respective time steps, and wherein one or more landmarks are associated with one or more decision points based upon the states predicted for the respective time steps that define the one or more decision points.

8. A method according to claim 1 further comprising:
    receiving natural language input comprising one or more sentences including the sentence from which words are encoded; and
    generating a landmark graph from the natural language input based upon the actions and the states that are predicted for respective time steps of the sentence.

9. An apparatus configured to evaluate natural language input to identify actions and landmarks, the apparatus comprising processing circuitry and at least one memory including computer program code instructions, the computer program code instructions configured to, when executed by the processing circuitry, cause the apparatus to:
    encode one or more word representations in context based upon one or more other word representations in at least one of a forward direction or a backward direction within a sentence of the natural language input;
    generate an action context vector defining actions that occur during each of a plurality of time steps;
    generate a state context vector defining one or more landmarks associated with each of the plurality of time steps;
    predict the state for a respective time step by defining the one or more landmarks associated with the respective time step, wherein the computer program code instructions configured to generate the state context vector and predict the state are based upon a combination of a result of encoding the one or more word representations in at least one of the forward direction or the backward direction within the sentence, the one or more word representations and the state predicted during a prior time step; and
    predict an action for the respective time step based on the action context vector and the state context vector.

10. An apparatus according to claim 9 wherein the computer program code instructions configured to generate the action context vector comprise computer program code instructions configured to generate the action context vector based at least partially upon a plurality of attention weights associated with respective time steps, actions and words of the sentence.

11. An apparatus according to claim 9 wherein the computer program code instructions configured to generate the state context vector comprise computer program code instructions configured to generate the state context vector based at least partially upon a plurality of attention weights associated with respective time steps, actions and words of the sentence.

12. An apparatus according to claim 9 wherein the computer program code instructions configured to predict the state for a respective time step comprise computer program code instructions configured to evaluate in accordance with a sigmoid function a vector of scores indicative of whether a respective word refers to a landmark for a respective time step.

13. An apparatus according to claim 9 wherein the computer program code instructions are further configured to, when executed by the processing circuitry, cause the apparatus to generate a landmark graph based upon the actions and the states that are predicted for the respective time steps, wherein the landmark graph comprises a plurality of decision points defined by the respective time steps and interconnected by the actions predicted for the respective time steps, and wherein one or more landmarks are associated with one or more decision points based upon the states predicted for the respective time steps that define the one or more decision points.

14. An apparatus according to claim 9 wherein the computer program code instructions are further configured to, when executed by the processing circuitry, cause the apparatus to:
receive the natural language input comprising one or more sentences including the sentence from which words are encoded; and
generate a landmark graph from the natural language input based upon the actions and the states that are predicted for respective time steps of the sentence.

15. An apparatus configured to evaluate natural language input to generate a landmark graph, the apparatus comprising processing circuitry and at least one memory including computer program code instructions, the computer program code instructions configured to, when executed by the processing circuitry, cause the apparatus to:
receive the natural language input comprising one or more sentences;
encode one or more word representations in context based upon one or more other word representations in at least one of a forward direction or a backward direction within a sentence of the one or more sentences of the natural language input;
generate an action context vector and a state context vector defining actions that occur during each of a plurality of time steps and one or more landmarks associated with each of the plurality of time steps, respectively;
predict an action and a state for a respective time step, wherein the action is predicted based upon the action context vector and the state context vector and the state is predicted based upon a combination of a result of encoding the one or more word representations in at least one of the forward direction or the backward direction within the sentence, the one or more word representations and the state predicted during a prior time step; and
generate the landmark graph from the natural language input based upon the actions and the states that are predicted for respective time steps of the sentence.

16. An apparatus according to claim 15 wherein the computer program code instructions configured to generate the landmark graph from the natural language input comprise computer program code instructions configured to generate the landmark graph so as to include a plurality of decision points defined by the respective time steps and interconnected by the actions predicted for the respective time steps, and wherein one or more landmarks are associated with one or more decision points based upon the states predicted for the respective time steps that define the one or more decision points.

17. An apparatus according to claim 15 wherein the computer program code instructions configured to generate the landmark graph from the natural language input comprise computer program code instructions configured to generate the landmark graph in real time or near real time relative to receipt of the natural language input.

18. An apparatus according to claim 15 wherein the computer program code instructions configured to generate the action context vector comprise computer program code instructions configured to generate the action context vector based at least partially upon a plurality of attention weights associated with respective time steps, actions and words of the sentence.

19. An apparatus according to claim 15 wherein the computer program code instructions configured to generate the state context vector comprise computer program code instructions configured to generate the state context vector based at least partially upon a plurality of attention weights associated with respective time steps, actions and words of the sentence.

20. An apparatus according to claim 15 wherein the computer program code instructions configured to predict the state for a respective time step comprise computer program code instructions configured to evaluate in accordance with a sigmoid function a vector of scores indicative of whether a respective word refers to a landmark for a respective time step.

\* \* \* \* \*